United States Patent [19]
Wang et al.

[11] Patent Number: 5,532,084
[45] Date of Patent: Jul. 2, 1996

[54] MANGANESE DIOXIDE PRODUCT

[75] Inventors: Enoch I. Wang, Mansfield, Mass.; William L. Bowden, Nashua, N.H.; Lifun Lin, Lincoln, Mass.

[73] Assignee: Duracell Inc., Bethel, Conn.

[21] Appl. No.: 446,370

[22] Filed: May 22, 1995

Related U.S. Application Data

[60] Continuation-in-part of Ser. No. 237,434, May 3, 1994, Pat. No. 5,482,796, which is a division of Ser. No. 122,966, Sep. 20, 1993, Pat. No. 5,348,726, which is a division of Ser. No. 952,034, Sep. 28, 1992, Pat. No. 5,277,890.

[51] Int. Cl.$^6$ .............................. H01M 4/50; C01G 45/02
[52] U.S. Cl. ........................................... 429/224; 423/605
[58] Field of Search .................................... 429/224, 194; 423/605; 252/182.1

[56] References Cited

U.S. PATENT DOCUMENTS

| | | | |
|---|---|---|---|
| 4,277,360 | 7/1981 | Mellors et al. | 429/224 X |
| 4,959,282 | 9/1990 | Dahn et al. | 429/224 |

OTHER PUBLICATIONS

T. Nishimura and Y. Umetsu, *Shizen Sozai Gakkai–shi*, vol. 107 (Jun. 1991) No. 11, pp. 805–810.
Japanese patent publication (Kokai) Application Sho 53–111429, Sep. 1978.

*Primary Examiner*—Anthony Skapars
*Attorney, Agent, or Firm*—Ronald S. Cornell; Robert J. Feltovic; Barry D. Josephs

[57] ABSTRACT

The invention relates to the manufacture of manganese dioxide by a chemical process. The resulting product takes the form of gamma manganese dioxide particles characterized by filament-like protrusions of ramsdellite manganese dioxide jutting out from the surface of the particles. The manganese dioxide particles having such features can be manufactured by reacting manganese sulfate with sodium peroxodisulfate in an aqueous solution. The process can be controlled to yield high density manganese dioxide. The manganese dioxide formed in the process can be deposited directly onto the surface of electrolytic manganese dioxide (EMD). The manganese dioxide product is particularly suitable for use as a cathode active material in electrochemical cells.

14 Claims, 7 Drawing Sheets

199x  100 μm 2,030x  10 μm 2,040x  10 μm 9,850x  1 μm

200x 2,040x

450x 4,600x

MANGANESE DIOXIDE PRODUCT

This is a continuation-in-part of application Ser. No. 08/237,434, filed May 3, 1994, now U.S. Pat. No. 5,482,796, which is a divisional of application Ser. No. 08/122,966, filed Sep. 20, 1993 (U.S. Pat. No. 5,348,726) which is a divisional of application Ser. No. 07/952,034, filed Sep. 28, 1992 (U.S. Pat. No. 5,277,890).

The invention relates to a process for production of manganese dioxide. The invention also relates to a new form of manganese dioxide product for use as a cathode active material in electrochemical cells.

Manganese dioxide can be of various crystalline structures, for example, crystalline structures such as alpha, beta, gamma, hollandite, romanechite and ramsdellite are documented. Manganese dioxide is commonly employed as a cathode active material in commercial batteries. Such manganese dioxide has been derived from naturally occurring manganese dioxide (NMD) and synthetically produced manganese dioxide which includes electrolytic manganese dioxide (EMD) and chemical manganese dioxide (CMD). NMD has a high impurity content and cannot be employed in alkaline or lithium cells.

EMD is typically manufactured by direct electrolysis of manganese sulfate and sulfuric acid. The high purity and high density of EMD make it desirable for use as a cathode active material in alkaline and lithium cells.

The features of the product of the invention will be better appreciated with reference to the following figures.

Figure 1A:
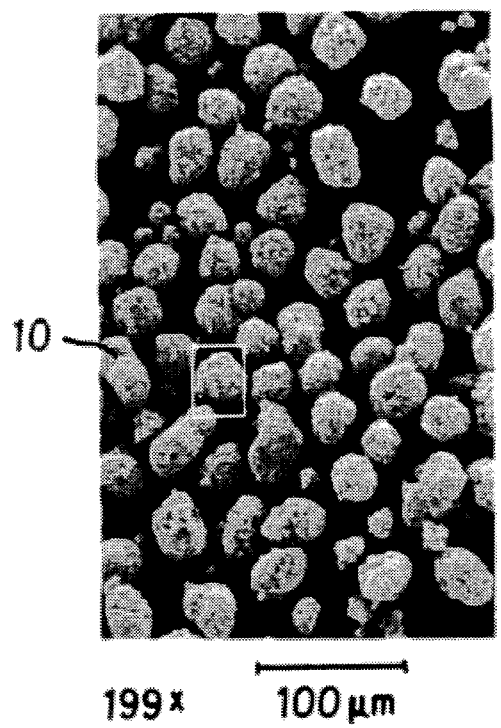
FIG. 1A is an electron photomicrograph showing the $MnO_2$ particles from the process of the invention carried out at slow rate of heating of reactants.

The present invention involves a process for production of battery grade chemical manganese dioxide which results in a new form of particulate manganese dioxide product. The new form of $MnO_2$ product may be referenced as P-CMD (a new name) in the figures and description herein. The P-CMD product of the invention when used as cathode active material in electrochemical cells, particularly alkaline and lithium cells, provides these cells with higher capacity and energy density per gram than are obtainable from the same cells employing conventional chemical manganese dioxide (CMD) or electrolytic manganese dioxide (EMD). Additionally, the discharge voltage profiles of cells, particularly lithium cells, containing the P-CMD as cathode active material, are higher than in conventional cells employing EMD or CMD cathode material. This is very attractive in that the use of P-CMD as cathode material can result in a higher power cell. The P-CMD product is characterized by filament-like protrusions of ramsdellite $MnO_2$ jutting out from the surface of particulate gamma $MnO_2$. It is theorized that the ramsdellite structure of the protruding filaments is largely responsible for the higher discharge voltage profile attainable in cells employing the P-CMD product as cathode material.

The process herein described allows for greater control of properties such as density, surface area and particle size than is possible with present processes for the manufacture of conventional forms of EMD or CMD. The process therefore allows for production of high purity battery grade manganese dioxide which can be made to have properties more nearly optimal for a given electrochemical cell or battery type. In particular a high density of the $MnO_2$ product is obtainable. The high density of the $MnO_2$ product is comparable to that obtained from electrolytic manganese dioxide (EMD), yet the surface area of each $MnO_2$ particle is greater than that obtained from conventional EMD and CMD processes. The high useful surface area of each particle is a factor leading to better performance, e.g, higher capacity, particularly in lithium cells containing $MnO_2$. By "useful" surface area we refer to the surface area which is accessible to the electrolyte. The filament-like protrusions give the higher surface area of the particulate $MnO_2$ and thus lead to better cell performance.

The process of the invention for production of battery grade manganese dioxide is carried out principally by reacting an aqueous solution of manganese sulfate with sodium peroxodisulfate.

The reaction may be represented as follows:

$$MnSO_4 + Na_2S_2O_8 + 2H_2O = MnO_2 + Na_2SO_4 + 2H_2SO_4 \qquad (I)$$

When an aqueous solution of manganese sulfate ($MnSO_4$) is reacted with sodium peroxodisulfate ($Na_2SO_2O_8$), $MnO_2$ is directly obtainable as a reaction product in the form of a precipitate. The $MnO_2$ precipitate tends to form spherical particles having filament-like protrusions of $MnO_2$ emanating from each particle surface. The spherical particles and filament-like protrusions emanating therefrom are pure $MnO_2$. The filament-like protrusions are crystalline $MnO_2$ and appear as filaments, hairs, fibers or needles which jut out (typically straight out, but may also be slanted out) from the surface of each $MnO_2$ particle and are uniformly distributed over the particle surface. The term "filament-like" or "filamentary" as used herein shall be construed as including thin, elongated, protruding structures such as but not limited to filaments, hairs, needles and fibrous structures. They have an elongated backbone or spine structure along a major portion of their length and appear to be uniformly and densely distributed over the particle surface. The "filament-like" $MnO_2$ protrusions are characterized by a length to width ratio between about 2:1 and 20:1, typically between about 3:1 and 10:1, wherein the width and length refer to those portions of the protrusions which are visible from the particle surface. The average length of the "filament-like" protrusions is typically between 0.3 to 1 micron and the average width is typically between 0.1 to 0.3 micron. These dimensions are measurable at a magnification of about 40,000 times actual size.

Figure 9:
FIG. 9 is an electron photomicrograph of a single protruding filament taken at a magnification of 5,900,000 times actual size of a typical $MnO_2$ product of the invention (P-CMD).

The crystalline structure of the P-CMD particles as a whole has been determined by powder X-ray diffraction analysis to be at least 95% gamma $MnO_2$. That is, at least 95% by weight of the P-CMD particle as a whole is of gamma $MnO_2$. Surprisingly, however, the filament-like protrusions of $MnO_2$ emanating from the surface of a P-CMD particle (which make up a very small percent by weight of the P-CMD particle) have been determined to be essentially of ramsdellite single crystal structure. At least the majority by weight of the $MnO_2$ in the filament protrusions is of ramsdellite crystalline structure. More characteristically at least 95% by weight of the $MnO_2$ in the filament is of ramsdellite crystalline structure. Analysis of many regions along the length of a single filament-like protrusion of a P-CMD particle is made using a high resolution transmission electron microscope (HRTEM) followed by electron diffraction analysis of randomly selected regions of the filament. The results of a very high magnification (5,900,000 times actual size) of a representative region of a single filament-like protrusion emanating from the surface of a P-CMD particle is shown in the electron photomicrograph of FIG. 9. The rows of dark spots shown in FIG. 9 are the atomic structures ($MnO_6$ octahedra) while the rows of white spaces are tunnel patterns between the octahedra deep within the crystalline structure. Such pattern, while not itself conclusive evidence of ramsdellite, nevertheless rules out the possibility of gamma $MnO_2$ structure which is known to be an intergrowth of at least several distinct crystalline phases resulting in a different tunnel pattern. (See, S. Turner and P. R. Buseck, "Defects In Nsutite (gamma-$MnO_2$) and Dry Cell Battery Efficiency", Nature, Vol. 304, pp. 143–146 (1983)).

Conclusive evidence of ramsdellite structure is obtained from analysis of an electron diffraction patterns of randomly selected regions along the length of the filament protrusion being analyzed. From analysis of the electron diffraction pattern the unit cell dimensions and space group can be obtained. The unit cell is the basic building block of a crystal. A crystal which is an intergrowth of multiple crystalline phases can have different type unit cells. A crystal which is of a single crystalline phase will have a single unit cell structure. The unit cell contains individual [$MnO_6$] octahedra with an Mn atom located at the center of each octahedron and an oxygen atom at each of the six corners thereof. The individual octahedra are connected in a distinct pattern by shared oxygen bonding to form the unit cell structure having an average of two oxygen atoms for each manganese atom ($MnO_2$). Repeating unit cells form the crystal. Each crystalline structure has a unique set of unit cell dimensions a, b, and c, space group parameter and angles between the sides of the unit cell. The cell dimensions a, b, and c determine the length, width and depth of the unit cell and the space group is a parameter used in further fingerprinting the cell structure. The use of electron diffraction for determining the structure of a unit cell is described, for example in A. West, *Solid State Chemistry and Its Applications,* John Wiley & Sons (1984), p.56. The above referenced parameters commonly used to define a unit cell are, for example, referred to in the articles contained in *The Journal of Solid State Chemistry,* Vol. 116, No. 2 (May 1995).

A series of diffraction patterns of microportions of a filament-like protrusions emanating from the surface of a typical P-CMD particle were taken. The diffraction patterns were taken at randomly selected microportions all along the length of the filament-like protrusions. This diffraction patterns were taken using a 200 kV electron microscope. Analysis of such patterns reveals an orthorhombic unit cell structure. (The orthorhombic structure is characterized by the cell dimensions a, b and c being of different values and the angles between adjacent sides of the cell being at 90 degrees.) Analysis of the diffraction patterns reveals that the determined orthorhombic unit cell structure has cell dimensions of a=4.5 angstrom, b=9.28 angstrom and c=2.87 angstrom and a Pbnm space group. These values are in agreement with literature reported orthorhombic unit cell dimensions of a=4.53 angstrom, b=9.27 angstrom and c=2.87 angstrom and Pbnm space group for the ramsdellite structure. (See, Bystrom, *Acta Chem. Scandanavia,* Vol. 3, p. 163 (1949).) Such a close match with the literature reported values determines conclusively that the crystalline structure of the $MnO_2$ filament is of ramsdellite structure. Specifically, the electron diffraction analysis of regions randomly selected all along the length of representative filament protrusions emanating from typical P-CMD particles reveals that at least the majority by weight of the $MnO_2$ in the filaments, characteristically at least 95% by weight of the $MnO_2$ in the filaments is ramsdellite $MnO_2$.

It is theorized that the ramsdellite structure of the filament-like protrusions is an important factor leading to the higher voltage discharge profiles attainable in cells employing the P-CMD product as cathode material. It is conjectured that such performance improvement is the result of the larger tunnels between rows of [$MnO_6$] octahedra within the unit cell structure of the ramsdellite filaments when compared to the average tunnel size within the unit cell structure of conventional EMD or CMD. It is conjectured that ions, particularly $Li^+$ and $H^+$ can diffuse faster in the larger tunnels within the ramsdellite structure and thus result in the higher discharge voltage profiles attainable in cells employing the P-CMD product as cathode material.

Unlike the well known Sedema process for producing CMD as disclosed in U.S. Pat. No. 2,956,860, the present invention permits the average particle size and density of the $MnO_2$ product to be altered by regulating the rate of the above reaction (I). This can be accomplished by simply controlling the amount or rate of heat supplied to the reaction. Unlike the Sedema process the present reaction does not require a catalytic $MnO_2$ substrate for receiving the $MnO_2$ product. In fact no catalyst is required and the $MnO_2$ product forms into dense, discrete particles without the need of a substrate material. However, it has been discovered that the reaction mixture can be seeded with almost any nonreactive solid material including metals and such material will act as a substrate for the $MnO_2$ product. That is, the $MnO_2$ reaction product will precipitate directly on the solid material.

It has been discovered that the above reaction mixture can be seeded with particles of electrolytic manganese dioxide (EMD) and the $MnO_2$ reaction product will deposit directly on the EMD. This results in a very high density hybrid $MnO_2$ whose outer surface comprises an $MnO_2$ coating having filament-like protrusions and high surface area, while the overall particle shape and interior structure is that characteristic of EMD. This hybrid form of $MnO_2$ may be used as cathode active material in conventional electrochemical cells, particularly alkaline or lithium cells. It is especially attractive for use in lithium cells, since the exposure of the EMD particles to $H_2SO_4$ during the reaction of the invention, leaches out small amounts of sodium that is trapped within the EMD particles. This reduces the amount of sodium impurity in the $MnO_2$ product, which is particularly advantageous if it is to be used as cathode active material in lithium cells. It has also been discovered that the reaction mixture can be advantageously seeded with chemical manganese dioxide (CMD), graphite or carbon black particles and metals. It can also be successfully seeded with other particles or substrates, for example $V_2O_5$ and $Bi_2O_3$. Such substrates may be in the form of particulate matter (e.g. powders), felt (e.g., graphite felt) or metal foil. In such case the $MnO_2$ reaction product will deposit directly onto the surface of these particles to form a hybrid particulate material which may be used as cathode active material in conventional electrochemical cells, particularly alkaline or lithium cells.

The above reaction (I) may typically be carried out in a temperature range between about 30° and 100° C., preferably between 70° and 90° C. The reaction (I) is preferably carried out in a temperature range between about 70° C. and 80° C. when the intended use of the $MnO_2$ product is as a cathode active material in an alkaline cell, and between about 80° and 90° C. when the intended use is as a cathode active material in a lithium cell. (For end application of the $MnO_2$ product to alkaline cells it is preferable to keep the final temperature below 85° C. in order to obtain a $MnO_2$ product with higher running voltage and capacity than EMD.) After the reaction is complete, the $MnO_2$ precipitate is collected and rinsed with distilled water until it has a pH of 7. It may then be dried at room temperature if its intended use is as a cathode active material in an alkaline cell. Alternatively, it may be dried at elevated temperature for more thorough drying, if its intended use is as cathode active material in a lithium cell. The resulting dry $MnO_2$ has a high purity and low sodium content of less than about 500 ppm. The dry $MnO_2$ product contains at least 95% gamma $MnO_2$ in particulate form. Every $MnO_2$ particle made by the process of the invention, when observed at a magnification between about 200 and 9850 times actual size, typically at a magnification between about 200 and 2000 times actual size, appears to have filament-like protrusions jutting out from the particle surface and these protrusions appear to be uniformly distributed around the particle surface. The gamma $MnO_2$ so produced may then be heat treated in conventional manner. This treatment is preferred if the end use of the $MnO_2$ is as cathode active material in lithium cells. (The filament-like protrusions will remain ramsdellite.) The heat treatment is well known; a suitable heat treatment process being disclosed in U.S. Pat. No. 4,921,689.

The $MnO_2$ product of the invention can be compacted and used as cathode active material in conventional $Zn/MnO_2$ alkaline cells or $Li/MnO_2$ lithium cells. It results in a cell having increased capacity and power than obtained with EMD cathode active material for the same cell. The $MnO_2$ can also be used as a catalyst in zinc/air cells.

It has been determined that various properties of the $MnO_2$ product can be altered and controlled by controlling the rate at which the reaction mixture is heated. In general a denser $MnO_2$ product is obtained if the reaction is carried out at a slower rate, e.g., if heat is supplied to the reaction at a slower rate. In a slower reaction individual particles of $MnO_2$ have time to grow to form larger more compact particles. In a faster reaction, e.g. produced by faster heating of the reaction mixture, the individual particles of the $MnO_2$ product do not have sufficient time to grow to form larger particles. Therefore the individual particles are smaller and less compact.

A sufficiently slow reaction rate to provide an $MnO_2$ product bulk density of about 15 to 32 $g/in^3$ (0.9 and 2 $g/cm^3$) SAD (Scott Apparent Density) is obtained if the aqueous reaction mixture of $MnSO_4$ and $Na_2S_2O_8$ is maintained at an initial temperature of about 50° C. for about 18 hours and then slowly increased at nearly constant rate for between about 5 and 10 hours until a final temperature of between about 70° to 90° C. is obtained. The reaction mix may then be left to stand for about 1 hour at this final reaction temperature, to obtain a maximum yield, typically about 70% of the stoichiometric amount of $MnSO_4$ converted to $MnO_2$. In this manner battery grade $MnO_2$ product can be obtained having bulk densities comparable to or even higher than the density of electrolytic manganese dioxide (EMD) which typically is at a level of about 25 to 28 $g/in^3$ (1.5 to 1.7 $g/cm^3$) SAD (Scott Apparent Density).

A sufficiently fast reaction rate to achieve an $MnO_2$ product bulk density of between about 8 to 15 $g/cm^3$ (0.5 to 0.9 $g/cm^3$) (Scott Apparent Density) is obtained if the aqueous reaction mixture of $MnSO_4$ and $Na_2SO_2O_8$ is heated at about constant rate from room temperature so that a final temperature of between 70° and 90°C. is achieved in about one to two hours. The reaction mixture may be left to stand for about one hour at this final temperature, to obtain a maximum yield, typically about 70% of the stoichiometric amount of manganese in $MnSO_4$ converted to $MnO_2$.

It has been determined that the stoichiometric yield of $MnO_2$ can be dramatically increased to about 95% by slowly adding a suitable alkaline base slowly to the reaction mixture. As the reaction proceeds the base reacts with the $H_2SO_4$ as it forms, thereby improving the reaction kinetics and ultimate yield of $MnO_2$. A preferred base is $Li_2CO_3$. Alternative bases can be employed to react with the $H_2SO_4$ to produce the same increase in yield of $MnO_2$. Such compounds include $Na_2CO_3$, $LiOH$, $NaOH$ and $MgO$. For ultimate use of the $MnO_2$ product in lithium cells it would be preferred to add compounds such as $Li_2CO_3$ and $LiOH$ to the reaction mixture to increase yield. For ultimate use of the $MnO_2$ product in alkaline cells it would be preferred to add $Na_2CO_3$ or $NaOH$ to the reaction mixture. If such compounds are added, they should be added slowly to the reaction mixture to prevent the pH of the mixture from abruptly increasing to a pH greater than about 3.

The $MnO_2$ reaction product of the invention takes the form of descrete particles having a spherical shape. The crystalline structure of these descrete particles as a whole are at least 95% gamma with the filament-like protrusions being of ramsdellite structure. The particle size of the $MnO_2$ reaction product can also be controlled by varying the rate at which the reaction mixture is heated. If the reaction mixture is slowly heated from an initial temperature of between about 40° C. and 70° C. at constant rate, e.g., of between about 1° C. and 7° C. per hour for at least 5 hours, the $MnO_2$ product will take the form of relatively large uniform spherical particles having a bulk density between about 15 and 32 $g/in^2$ (0.9 and 2 $g/cm^3$). If the reaction mixture is rapidly heated from an initial temperature between about 30° C. and 100° C. at a constant rate, e.g., between about 7° C. and 20° C. per hour for less than about 5 hours, the $MnO_2$ product will tend to take the form of relatively small spherical particles having a bulk density of between about 8 $g/in^3$ and 15 $g/in^3$ (0.5 and 0.9 $g/cm^3$).

If the reaction mixture is initially heated at a slow constant rate and later at a fast constant rate, the reaction product will contain a distribution of both large and small $MnO_2$ particles. While the overall shape of the individual $MnO_2$ particles produced is spherical, the surface features of each particle is characterized by filament-like (e.g. hair-like) microscopic protrusions distributed uniformly over the entire particle surface. Such filament-like surface structure results in $MnO_2$ particles having a useful surface area which can be greater than that achieved with EMD, but yet the bulk density is comparable to that of EMD. This is a benefit, particularly in lithium cells, because better performance and capacity is obtained when the useful surface area is increased over that of EMD. The filament-like protrusions are visible in electron photomicrographs taken at at least a magnification between about 200 and 9850 times actual size, typically at a magnification between about 200 and 2,000 times actual size.

The following examples illustrate the method of preparation of battery grade $MnO_2$ by the the process of the invention. All parts are parts by weight unless specified otherwise.

EXAMPLE 1

High density $MnO_2$ product (P-CMD) is prepared by the process of the invention as follows:

120 g of $MnSO_4 H_2O$ is dissolved in 1800 ml of distilled water. Then, stoichiometric amount of $Na_2S_2O_8$ (169 g) is added to the clear pinkish solution to form a reactant solution. While stirring, the solution is heated in about 2 hours from room temperature (20° C.) to 50° C. and is maintained at a temperature of 50° C. overnight (about 18 hrs) while continually stirring. This enhances the nucleation process. The reaction proceeds according to reaction (I) above referenced. The clear pinkish solution slowly turns brown and then eventually turns a black color as more $MnO_2$ is precipitated. After the 18 hour period the solution is then heated from about 50° C. at a constant rate of about 25° C. per hour for about 1 hour to a temperature of about 75° C. and is maintained at 75° C. for about 3 hours. The solution is then heated at constant rate of about 10° C. per hour for about 1 hour to a temperature of 85° C. and maintained at 85° C. for 1 hour. The solution is again heated at a constant rate 30° C. per hour for about ½ hour to a temperature of about 100° C. and maintained at 100° C. for about 1½ hours at which time the run is ended. The pH of the solution at the end of the run is less than 0.5. The solution is then cooled to room temperature (20° C.) in about one hour. The solution is filtered and the solid $MnO_2$ is continually rinsed with distilled water until the filtrate stream has a neutral pH of about 7. The resulting black powder is dried at 100° C. to drive off surface water. The overall yield of $MnO_2$ is 41 g or 67% of theoretical yield.

Figure 1B:
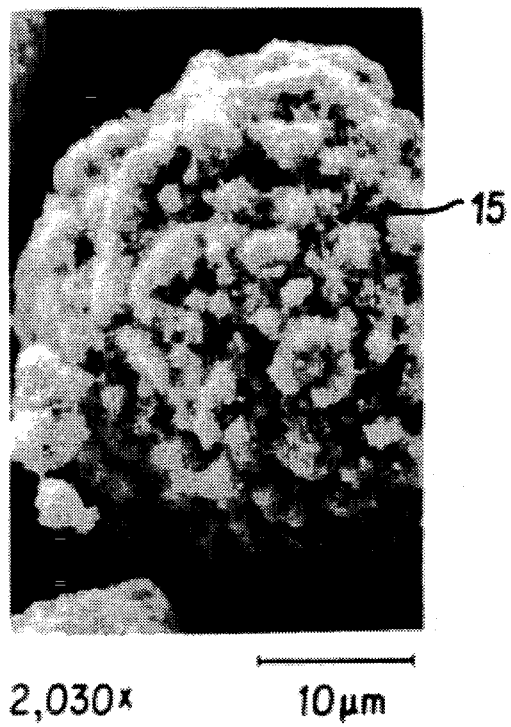
FIG. 1B is an electron photomicrograph of the particles in FIG. 1A enlarged to show the filament-like surface protrusions.
Figure 5A:
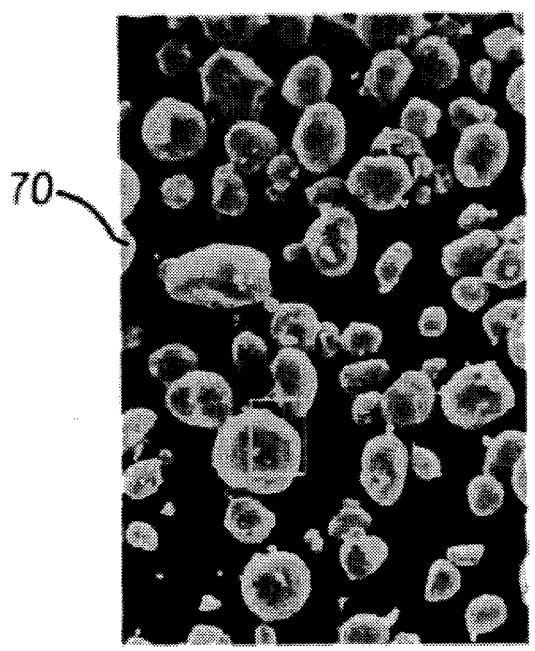
FIG. 5A is an electron photomicrograph of prior art chemical manganese dioxide (CMD) particles.
Figure 5B:
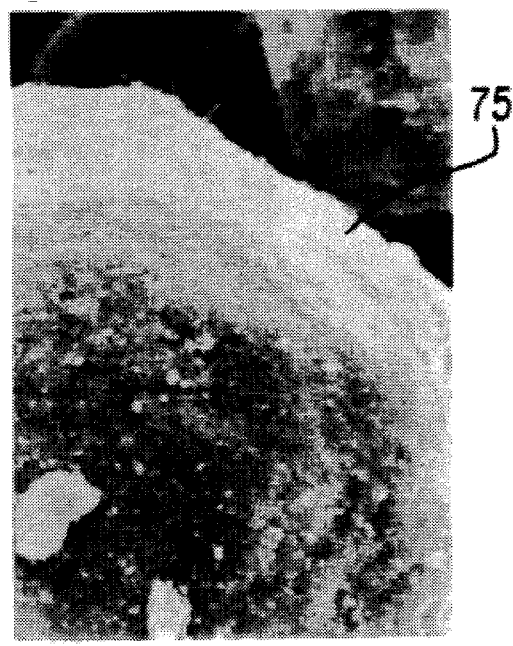
FIG. 5B is an electron photomicrograph of the particles in FIG. 5A enlarged to show surface features.

The resulting product is battery grade $MnO_2$ which is verified by x-ray diffraction to be at least 95% gamma crystalline structure. (No other type $MnO_2$ crystalline structure was detected, the 95% threshold being the limit of resolution of the x-ray diffraction analysis.) The $MnO_2$ product has a high bulk density of about 23 $g/in^3$ (1.4 $g/cm^3$) SAD (Scott Apparent Density). An electron photomicrograph representative of this $MnO_2$ product is shown in FIGS. 1A and 1B. The uniform spherical structure of the $MnO_2$ particles (e.g. particle 10) is shown in FIG. 1A taken at 199× magnification. The filament-like (e.g. hair-like) protrusions 15 emanating from the surface of each spherical particle are clearly visible in FIG. 1B, which shows an individual particle at 2,030× magnification. (The filament-like protrusions are determined by the method described in the foregoing to be essentially ramsdellite $MnO_2$, i.e. at least 95% by weight of the $MnO_2$ in the filaments is ramsdellite $MnO_2$.) By comparison the electron photomicrographs of the commercial battery grade CMD (WSLi) particles are shown in FIGS. 5A and 5B, which are taken at 202× and 2060× magnification, respectively. (The WSLi brand of CMD is available from Sedema, a division of Sadacem, S. A., Terte, Belgium.) It is clear from FIGS. 5A and 5B that representative particles 70 do not exhibit filament-like protrusions characteristic of the $MnO_2$ product of the invention (FIGS. 1A and 1B).

EXAMPLE 2

Figure 2A:
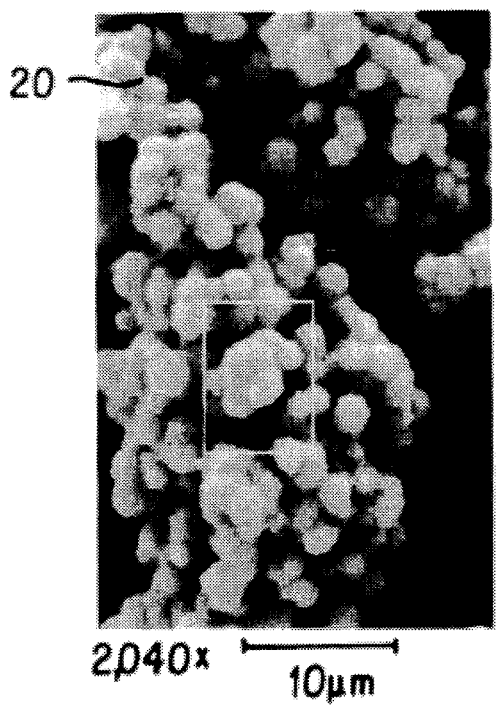
FIG. 2A is an electron photomicrograph showing smaller sized $MnO_2$ particles from the process of the invention carried out at fast rate of heating of the reactants.
Figure 2B:
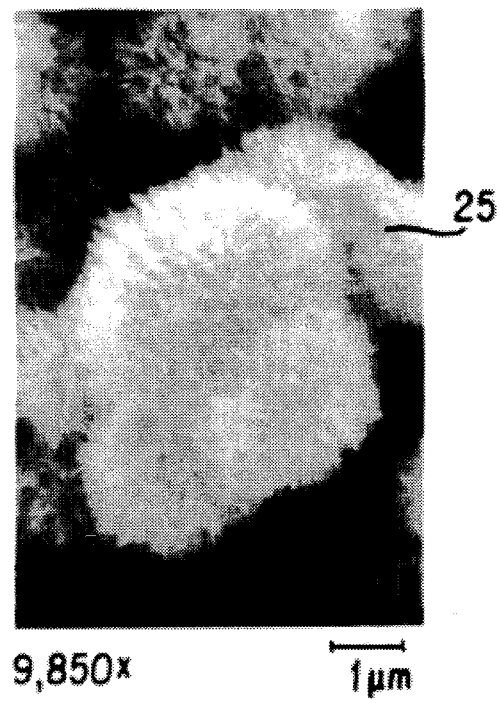
FIG. 2B is an electron photomicrograph of the particles in FIG. 2A enlarged to show the filament-like surface protrusions.

Lower density $MnO_2$ product (P-CMD) is prepared by the process of the invention as follows:

The $MnO_2$ product is made in a similar manner as described in example 1, except that rate of heating is faster leading to smaller size and less dense particles. Specifically, the same method of preparation and conditions as in example 1 are employed except the reactant solution is heated from 50° C. to 100° C. at rate of about about 17° C. per hour for a period of less than 5 hours, namely about 3 hours. FIGS. 2A and 2B are electron photomicrographs of the resulting $MnO_2$ product. The product sample represented in FIGS. 2A and 2B had a bulk density of about 8.7 $g/in^3$ (0.53 $g/cm^3$) (Scott Apparent Density) and is at least 95% gamma $MnO_2$.

The filament-like (e.g. hair-like) surface protrusions 20 and 25 of the individual $MnO_2$ particles may be seen in FIGS. 2A and 2B, respectively. These filament-like protrusions are of ramsdellite crystalline structure, specifically at least 95% by weight of the $MnO_2$ in the filaments is ramsdellite $MnO_2$. The $MnO_2$ particles as described in this example may be used as cathode active material in electrochemical cells, particularly alkaline and lithium cells. If intended for use in lithium cells the $MnO_2$ product (P-CMD) may be heated at a temperature between about 300°–400° C., typically for about 6 hours at 350° C. or 32 hours at 300° C. to treat the $MnO_2$ particles and evaporate any residual moisture entrapped therein.

EXAMPLE 3

The $MnO_2$ is produced in a manner similar to that described in Example 1 except that $Li_2CO_3$ is added to the reaction mixture in order to increase the yield of $MnO_2$. 583 g of $MnSO_4 H_2O$ is first dissolved in 8 liter of distilled water in a 12 liter round bottom flask. Then stoichiometric amount of $Na_2S_2O_8$ (822 g) is added to the slightly pinkish solution. The solution is heated at a constant slow rate for 6 hours from room temperature (20° C.) to 55° C. Then 23 g of $Li_2CO_3$ is then slowly added and the solution is maintained at a temperature of about 55° C. for 18 hours while continually mixing. An additional 69 g of $Li_2CO_3$ is added after the 18 hour period and the solution is heated at a constant rate of about 6° C. per hour for about 2.5 hours up to a temperature of 70° C. Another 36 g of $Li_2CO_3$ is then added and the solution is heated at a constant rate of about 5° C. per hour for 2 hours up to a temperature of about 80° C. The solution is then heated at a reduced constant rate of about 3.3° C. per hour for 3 more hours up to a temperature of 90° C. The solution temperature is held for about 18 hours and then cooled in about 1 hour to room temperature (20° C.). The $MnO_2$ product (P-CMD) is recovered and dried in the manner described in Example 1. The yield of $MnO_2$ is 270 g or 90% of the theoretical yield. At least 95% of the $MnO_2$ product is verified by x-ray diffraction to be gamma $MnO_2$. (The filament-like protrusions emanating from the surface of the individual $MnO_2$ particles forming the product are of ramsdellite $MnO_2$ structure. Specifically, at least 95% by weight of the $MnO_2$ in the filaments is ramsdellite $MnO_2$.) The bulk density of the $MnO_2$ product is measured as 20 $g/in^3$ (1.2 $g/cm^3$) (Scott Apparent Density). This $MnO_2$ product can be heat treated as in Example 2 whereupon it becomes particularly suitable for use as a cathode active material in lithium cells.

EXAMPLE 4

This example demonstrates the use of EMD particles as a substrate for the precipitation of $MnO_2$ in accordance with the invention.

120 g of $MnSO_4 \, H_2O$ is dissolved in 1.6 liter of distilled water in a 2 liter beaker by stirring. 120 g of $Na_2S_2O_8$ and 20 g of EMD (from Kerr-McGee) are then added to the slightly pinkish clear solution.

The heating regimen is as follows. The whole mixture is first heated from room temperature (20° C.) to 55° C. in about 2 hours and held at this temperature for 18 hours while continually mixing. The whole mixture is then heated slowly at constant rate for about 5.5 hours to a temperature of 75° C. Then the whole mixture is heated for another hour at constant rate to a temperature of 100° C. Thereupon the mixture is cooled to room temperature (20° C.) in about 1 hour.

The hybrid $MnO_2$ product is rinsed with distilled water until neutral. Then it is filtered and dried at 100° C. to remove surface water. The total yield of hybrid $MnO_2$ product is 60 g and its bulk density is 24 $g/in^3$ (1.5 $g/cm^3$) (Scott Apparent Density). The hybrid $MnO_2$ product contains about 67 wt % of the deposited $MnO_2$ and 33 wt % EMD.

Figure 3A:
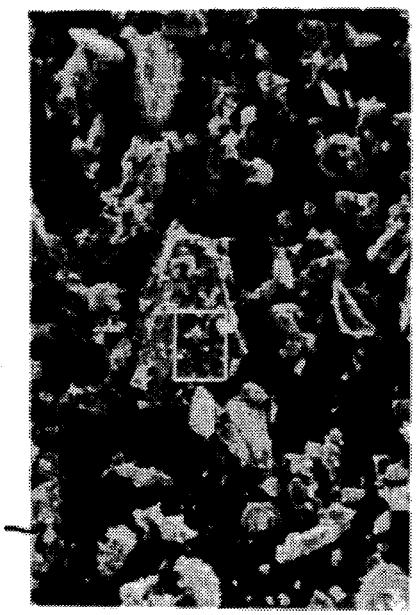
FIG. 3A is an electron photomicrograph of EMD particles (prior art).
Figure 3B:
FIG. 3B is an electron photomicrograph of the EMD particles in FIG. 3A enlarged to show the characteristically irregular particle shape and smooth surface structure.
Figure 4A:
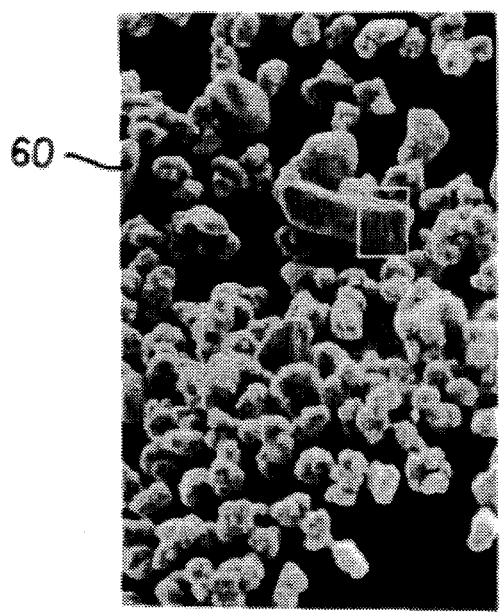
FIG. 4A is an electron photomicrograph of EMD particles coated with $MnO_2$ produced by the process of the invention.
Figure 4B:
FIG. 4B is an electron photomicrograph of coated EMD particles in FIG. 4A enlarged to show the filament-like surface protrusions.

The $MnO_2$ product consists of $MnO_2$ product (P-CMD) deposited uniformly over the surface of the individual EMD particles to form a hybrid $MnO_2$ product. Each particle of the hybrid $MnO_2$ product retains the overall irregular shape of the EMD particle, but exhibits a surface formed of uniformly distributed filament-like protrusions characteristic of the P-CMD made in accordance with the process of the invention. The filaments are of ramsdellite structure. (At least 95% by weight of the $MnO_2$ in the filaments are ramsdellite $MnO_2$.) Representative electron photomicrographs of the hybrid $MnO_2$ particles are shown in FIGS. 4A and 4B. By way of comparison FIGS. 3A and 3B are electron photomicrographs of the EMD particles. These figures clearly show the irregular shape and smooth surface of each EMD particle. FIG. 4A shows the overall shape of each hybrid particle, e.g., particle 60 (at a magnification of 450 times actual), as resembling the shape of the EMD particles, e.g. particle 50 (FIG. 3A). However, as may be seen from FIG. 4B, the surface features of each hybrid $MnO_2$ particle exhibit filament-like protrusions, e.g. protrusions 65, emanating from and uniformly covering the surface of each hybrid particle. This is the result of the deposition of the P-CMD product of the present process onto the EMD particles. An advantage of this hybrid is that it has higher surface area than EMD, but yet also has high bulk density. It is also cheaper to manufacture than an equivalent weight of P-CMD produced by the process of the invention. The hybrid $MnO_2$ so produced can be used as cathode active material in electrochemical cells. If heat treated before application, e.g. as in Example 1, it can be employed as cathode active material in lithium cells.

EXAMPLE 5

This example demonstrates the preparation of high density P-CMD specifically for use as cathode active material in alkaline cells.

583 g of $MnSO_4 \, H_2O$ are dissolved in 8000 ml of distilled water contained in a 12 liter round bottom flask. Then, stoichiometric amount of $Na_2S_2O_8$ (822 g) is added to the clear pinkish solution. The solution is heated from room temperature (20° C.) to 50° C. in about 2 hours. The solution is then slowly heated from 50° C. to 65° C. over a period of eight hours and maintained at a temperature of 65° C. for 18 hours while continually stirring. The reaction proceeds according to reaction (I) above referenced. The clear pinkish solution slowly turns to a brown and then eventually black color as more $MnO_2$ is deposited. Following the 18 hour period the solution is then finally heated slowly at about a constant rate from 65° C. to 80° C. over a period of eight hours. The solution is cooled to room temperature (20° C.) in about 1 hour. The P-CMD particulate product is recovered by filtering the final solution and continually rinsing with distilled water until the filtrate has a neutral pH of about 7. The resulting black powder is dried as in the preceeding examples to drive off surface water. The resulting product is battery grade $MnO_2$ which is verified by x-ray diffraction to be at least 95% gamma crystalline structure. (The filament-like protrusions emanating from the surface of the P-CMD particles are determined by the method described in the foregoing to be of ramsdellite structure. Specifically, at least 95% by weight of the $MnO_2$ in the filaments are ramsdellite $MnO_2$.) The $MnO_2$ product has a high bulk density of about 28 $g/in^3$ (1.7 $g/cm^3$) SAD (Scott Apparent Density). (For usage in an alkaline cell, the $MnO_2$ product of the invention preferably should exhibit a high SAD, preferably of at least 25 $g/in^3$ (1.5 $g/cm^3$) which in turn has been found to result in a high load voltage and capacity.)

Performance Tests:

EXAMPLE 6

Figure 6A:
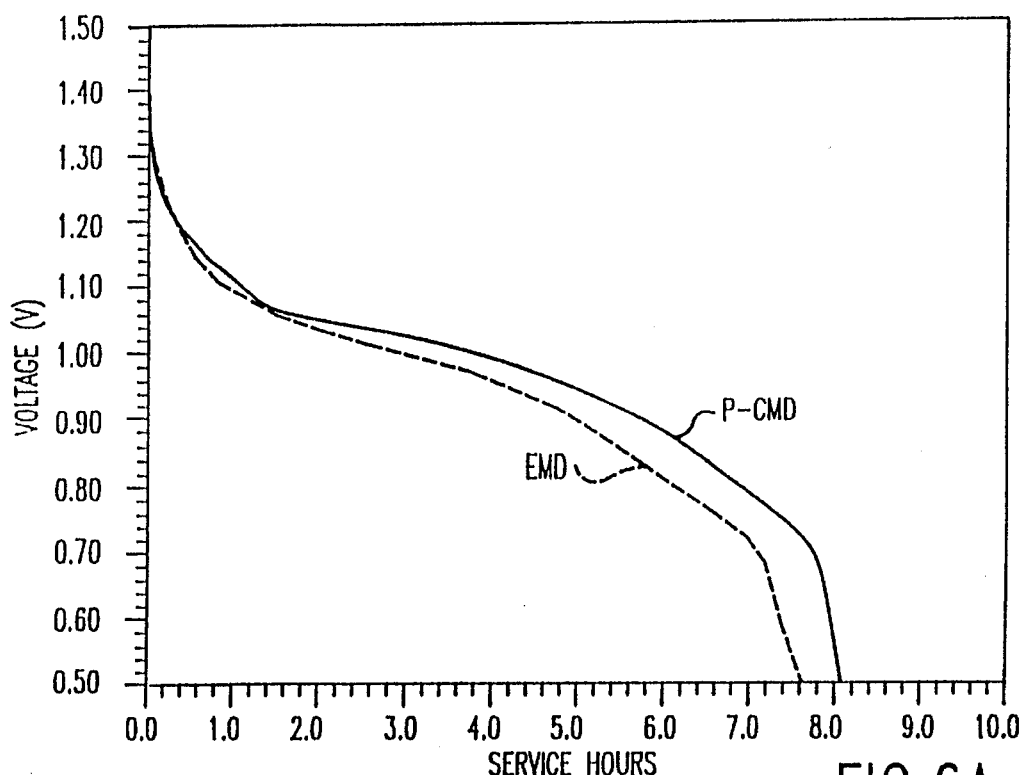
FIG. 6A is a graphical plot of the voltage profile (voltage versus service hours) in an alkaline AA cell at 3.9 ohm constant load, comparing performance of the $MnO_2$ of the invention (P-CMD) with conventional EMD.

The $MnO_2$ product of the invention (P-CMD) is evaluated for its electrochemical performance in an AA cell. The performace of the $MnO_2$ product (P-CMD) as cathode active material in an alkaline AA cell is shown in FIG. 6A. The performance of the $MnO_2$ product (P-CMD) as shown in this figure is compared to conventional EMD cathode active material (from Kerr-McGee Corp.) for the same type cell. It is clear from this figure that the $MnO_2$ product (P-CMD) exhibits a slightly higher running voltage and a greater capacity (amp-hrs) than obtainable for the same cell using EMD as cathode material. The $MnO_2$ product (P-CMD) is believed to be the first CMD that exhibits better performance in alkaline cells than EMD.

EXAMPLE 7

The $MnO_2$ product of the invention is evaluated for its performance in a flooded alkaline cell. This cell utilizes conventional zinc anode and KOH electrolyte and paper separator as employed in commercial Duracell alkaline cells. The flooded cell is in the shape of a disk of same diameter as that of a Duracell AA cell. The flooded cell is cathode limited, thus excess electrolyte (1.5 g) and excess zinc (5.6 g) are used in order to evaluate the intrinsic performance of the $MnO_2$ product (0.17 g) as cathode active material. The flooded cell is fabricated by first pouring a mixture of $MnO_2$ powder, graphite and KOH (60 wt % $MnO_2$, 34.5 wt % graphite and 5.5 wt % KOH) into the bottom of an empty AA size nickel coated stainless steel can which is open at one end and closed at the other. The $MnO_2$ powder is then compacted into a disk-like shape. A paper separator is then placed on top of the $MnO_2$ disk. The separator is then filled with the KOH electrolyte and the remaining volume of the can then filled with a zinc slurry. The open end of the can is covered with a stainless steel cap. The cap is in electrical contact with the zinc slurry through a nail penetrating from the cap into the slurry.

Figure 6B:
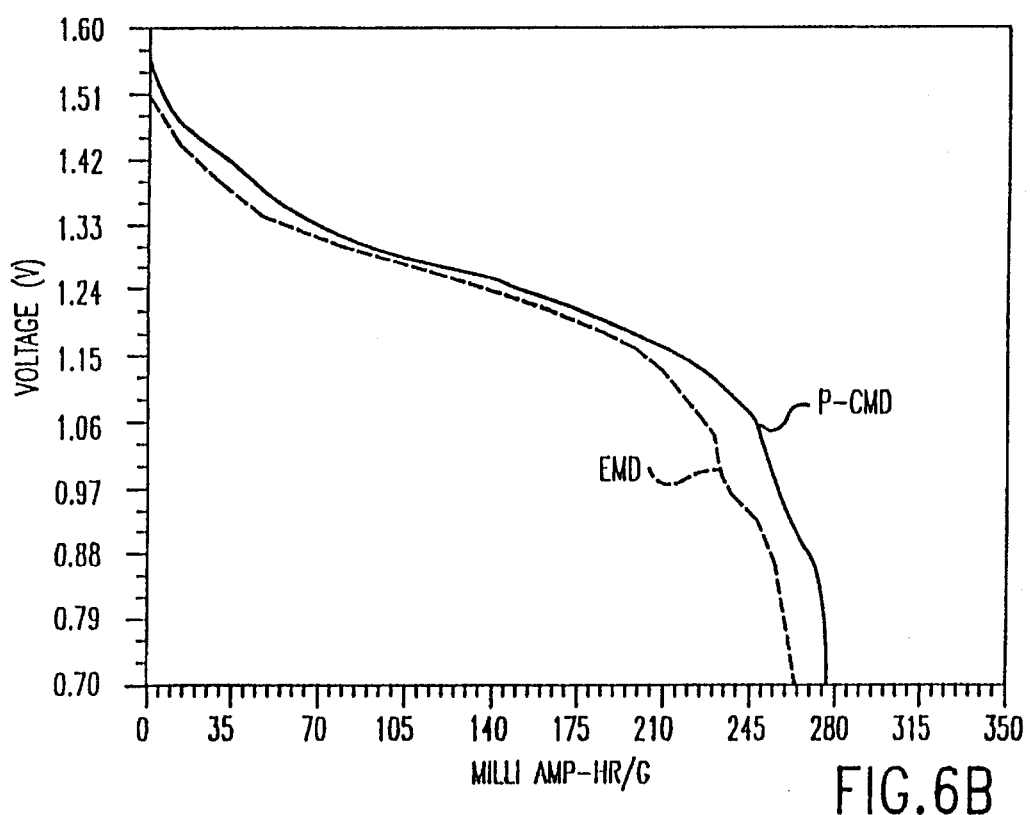
FIG. 6B is a graphical plot of the voltage profile (voltage versus milli amp-hour per gram $MnO_2$) in a flooded alkaline cell at 0.3 milli-amp/cm² current drain rate, comparing performance of the $MnO_2$ product of the invention (P-CMD) with conventional EMD.

Two flooded cells are made as above described, but with one containing the $MnO_2$ product of the invention (P-CMD) as cathode material and the other containing conventional battery grade EMD (from Kerr-McGee Co.) as cathode material. The performance of the two cells are compared at a current drain rate of 0.3 milliamp/$cm^2$ and the results shown in FIG. 6B. It may be seen from the voltage profiles reported in FIG. 6B that the performance of the flooded alkaline cell utilizing the $MnO_2$ product (P-CMD) is superior to that employing the EMD.

EXAMPLE 8

The $MnO_2$ product obtained by the process described in example 3 is heated at about 350° C. for about six hours to treat the $MnO_2$ particles. (The filament-like protrusions remain as ramsdellite structure.) A coin shaped cell is fabricated utilizing a cathode active material prepared by mixing $MnO_2$, graphite and polytetrafluoroethylene binder in a weight ratio of 6:3:1. The cathode mixture is compacted by press molding it onto a stainless steel mesh and spot welding it onto a steel case which forms the positive electrode. The positive electrode containing the cathode material is immersed in a conventional lithium salt electrolyte composed of lithium hexafluorophosphate ($LiPF_6$) dissolved in propylene carbonate and dimethoxyethane organic solvents. Other conventional lithium salt electrolytes such as lithium perchlorate and organic solvents such as propylene carbonate, ethylene carbonate, dimethoxyethane and mixtures thereof can also be used. Excess amount of lithium is employed for the negative electrode. The negative electrode is formed by press molding a lithium foil onto a stainless steel mesh which in turn is spot welded to a steel case. A separator composed of a non-woven cloth is applied over the lithium foil. The positive electrode is assembled over the negative electrode with the separator therebetween. The assembly is performed in an argon filled dry chamber. The entire assembly is filled with the liquid electrolyte and then sealed by crimping the edge of the cell.

Figure 7A:
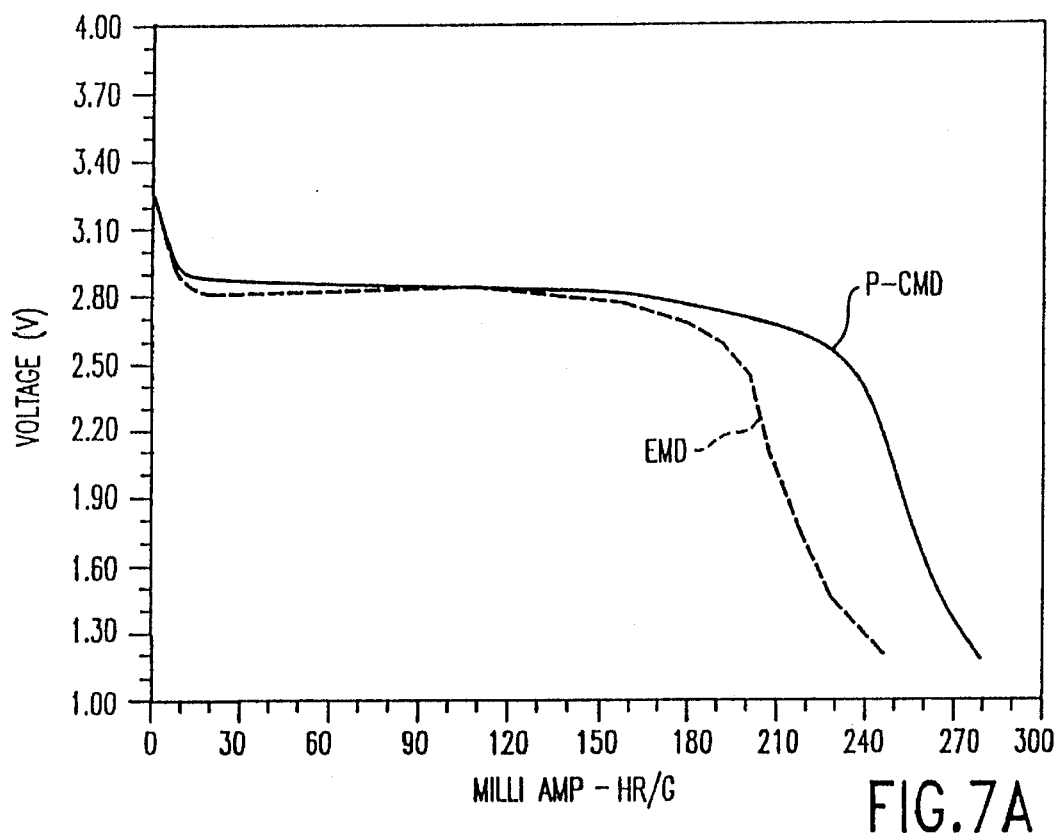
FIG. 7A is a graphical plot of the voltage profile (voltage versus milli amp-hour per gram $MnO_2$) in a lithium cell at 0.17 milli-amp/cm² current drain rate comparing performance of the $MnO_2$ product of the invention (P-CMD) with conventional EMD.
Figure 7B:
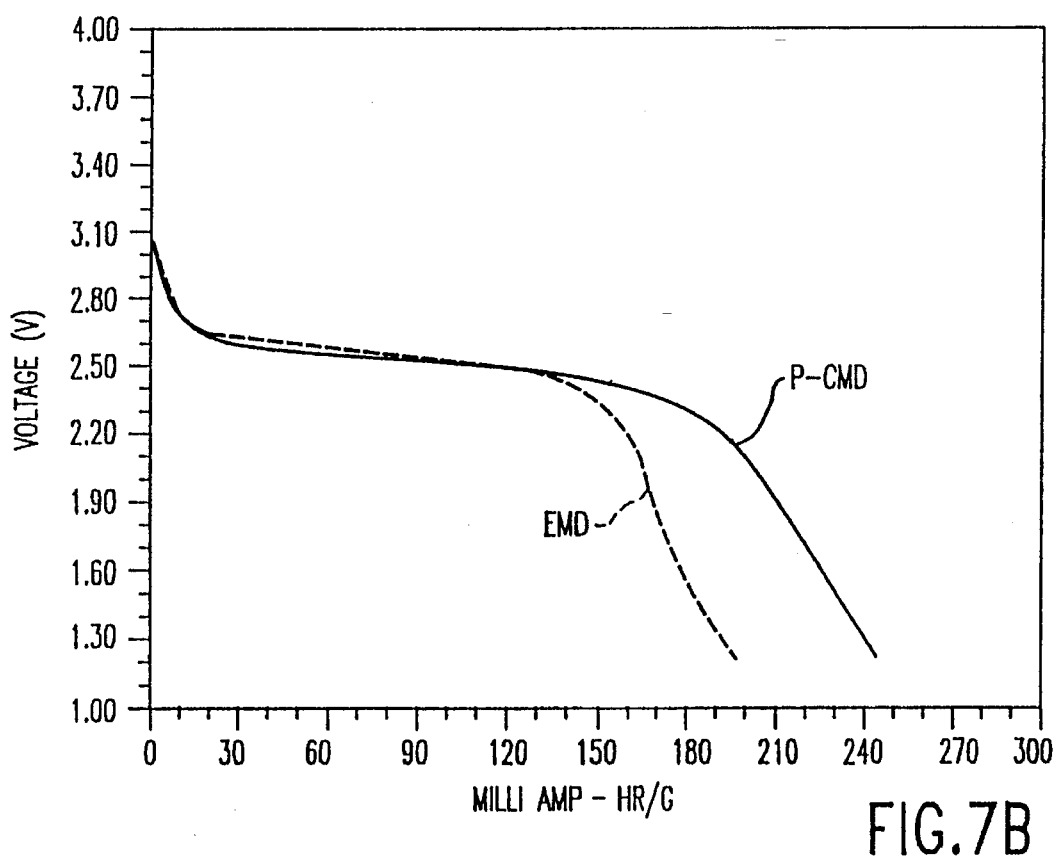
FIG. 7B is a graphical plot of the voltage profile (voltage versus milli amp-hour per gram $MnO_2$) in a lithium cell at 1.0 milli-amp/cm² current drain rate, comparing performance of the $MnO_2$ product of the invention (P-CMD) with conventional EMD.

Two lithium coin-shaped cells made in the above manner are discharged down to 1.2 volts with current drain rates of 0.17 and 1 milliamp/$cm^2$, respectively. The resulting voltage profiles for these cells utilizing the $MnO_2$ cathode active material of the invention (P-CMD) are shown in FIGS. 7A and 7B for drain rates at 0.17 and 1 milliamp/$cm^2$, respectively. Each figure also shows comparative voltage profiles obtained for a like cell at same current drain rates, but instead using conventional EMD cathode active material (from Kerr-McGee Corp.) which is heat treated and press molded for use in the lithium cell. As may be seen from the figures the $MnO_2$ cathode active material of the invention (P-CMD) exhibits a greater capacity (milliamp-hr/g) than the EMD. The capacity improvement of the $MnO_2$ product of the invention over that of EMD for the current drain rates of 0.17 and 1 milliamp/$cm^2$ are about 20% and 28%, respectively. The $MnO_2$ product of the invention, thus, shows performance improvement over EMD in lithium cells, particularly at the higher current rates.

Additionally, as may be seen from FIGS. 7A and 7B the discharge voltage profiles for the lithium cells containing P-CMD cathode material is significantly higher than the discharge voltage profiles of lithium cells containing EMD cathode material during about the latter half of the discharge cycle for the lithium cells employing P-CMD. The higher discharge voltage profile for the lithium cells containing P-CMD cathode results in a higher power cell. It is believed that the ramsdellite crystalline structure of the filament-like protrusions emanating from the surface of the P-CMD particles is responsible for the higher discharge voltage profile.

EXAMPLE 9

The same tests are performed as in Example 8 using the coin-shaped lithium cells assembled, as above described, except that the performance of the $MnO_2$ product of the invention (P-CMD) is compared against that of CMD. The CMD chosen is that commercially available for specific use in lithium cells, namely, that sold under the trade designation WSLi chemical manganese dioxide (CMD) from Sedema, division of Sadacem, S. A., Tertre, Belgium.

Figure 8A:
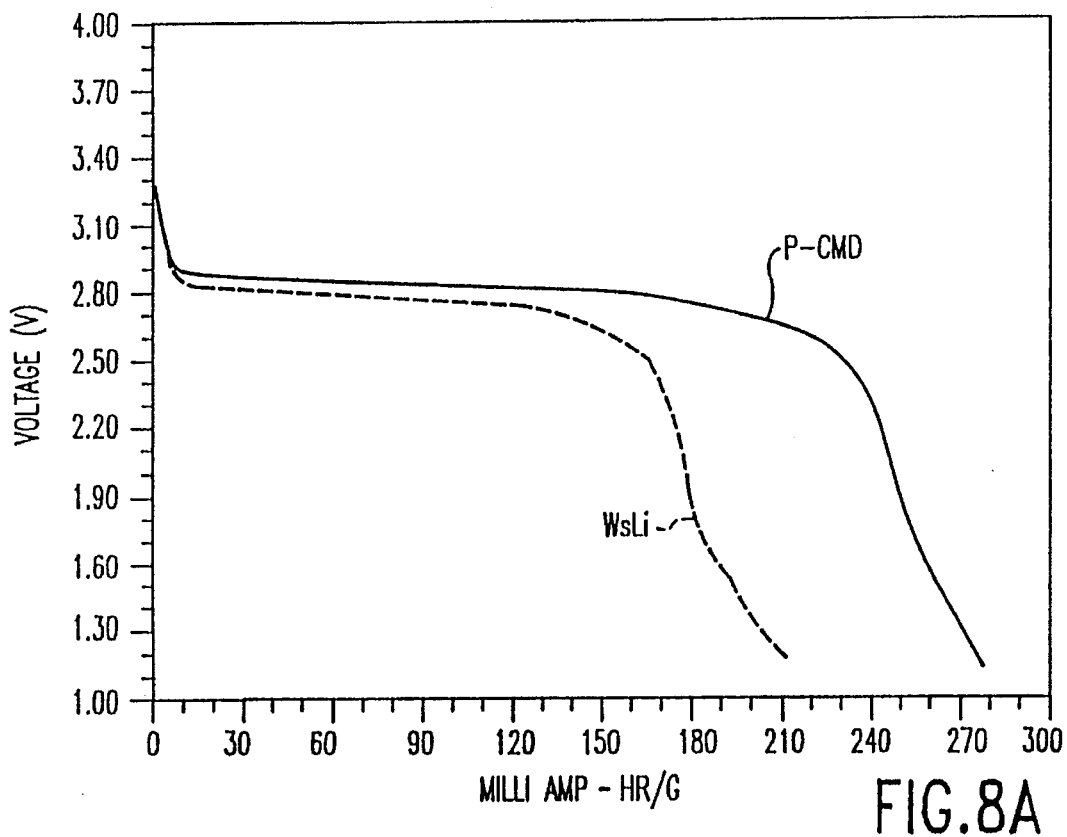
FIG. 8A is a graphical plot of the voltage profile (voltage versus milli amp-hour per gram $MnO_2$) in a lithium cell at 0.17 milli-amp/cm² current drain rate, comparing performance of the $MnO_2$ product of the invention (P-CMD) with conventional CMD (WSLi).
Figure 8B:
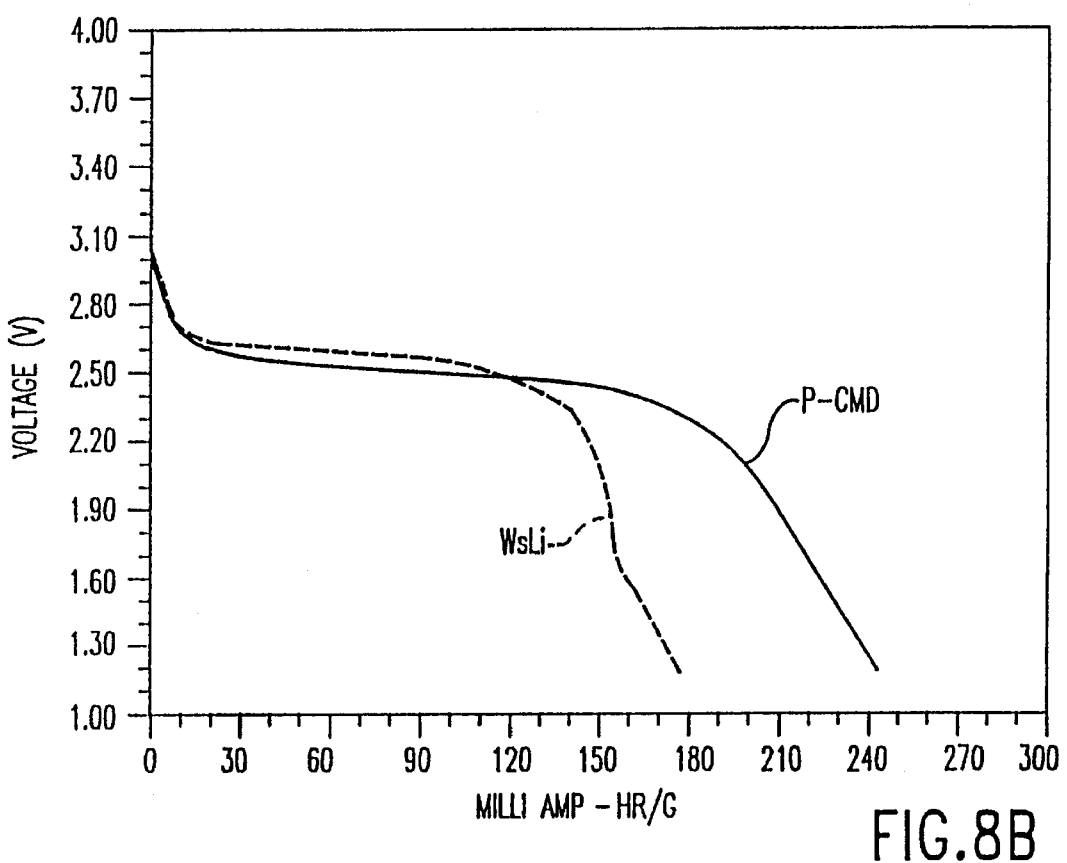
FIG. 8B is a graphical plot of the voltage profile (voltage versus milli amp-hour per gram $MnO_2$) in a lithium cell at 1.0 milli-amp/cm² current drain rate, comparing performance of the $MnO_2$ product of the invention (P-CMD) with conventional CMD (WSLi).

Two coin-shaped lithium cells are prepared as in example 8 but with one cell containing Sedema WSLi chemical manganese dioxide and the other containing the $MnO_2$ product of the invention (P-CMD) as the cathode active material. The voltage profiles for these two cells are given at current drain rates of 0.17 and 1.0 milliamp/$cm^2$ as illustrated in FIGS. 8A and 8B, respectively. As may be seen from these figures, the $MnO_2$ product of the invention (P-CMD) has significantly greater capacity (milliamp/g) than the Sedema CMD (WSLi) at the current drain rates tested.

Additionally, as may be seen from FIGS. 8A and 8B the discharge voltage profiles for the lithium cells containing P-CMD cathode material is significantly higher than the discharge voltage profiles of lithium cells containing Sedema CMD (WsLi) cathode material during about the latter half of the discharge cycle for the lithium cells employing the P-CMD. This results in a higher power cell. It is believed that the ramsdellite crystalline structure of the filament-like protrusions emanating from the surface of the P-CMD particles is responsible for the higher discharge voltage profile.

Although the present invention has been described with reference to specific embodiments, it should be recognized that variations are possible within the scope of the invention. Therefore, the invention is not intended to be limited to specific embodiments, but rather is defined by the claims and equivalents thereof.

What is claimed is:

1. A particulate $MnO_2$ material comprising particles having filamentary protrusions of $MnO_2$ jutting out from the surfaces of said particles, wherein at least the majority by weight of the $MnO_2$ in said filamentary protrusions is ramsdellite $MnO_2$.

2. The particulate $MnO_2$ material of claim 1 wherein at least 95% by weight of the $MnO_2$ in the filamentary protrusions is ramsdellite $MnO_2$.

3. The particulate $MnO_2$ material of claim 1 wherein the filamentary protrusions are visible at a magnification between about 200 and 9850 times actual size and are not visible at a magnification of less than about 200 times actual size.

4. The particulate $MnO_2$ material of claim 1 wherein said filamentary protrusions are substantially uniformly distributed over the surface of said particles and said filamentary protrusions have a length to width ratio between about 2:1 and 20:1.

5. The particulate $MnO_2$ material of claim 1 wherein said particles having said filamentary protrusions comprises as a whole at least 95% by weight gamma $MnO_2$.

6. An electrochemical cell having $MnO_2$ cathode active material in said cell, wherein the $MnO_2$ material comprises particles the surface of which comprises gamma $MnO_2$ having filamentary protrusions of $MnO_2$ jutting out from the surface of the particles, wherein at least the majority by weight of the $MnO_2$ in the filamentary protrusions is ramsdellite $MnO_2$.

7. The electrochemical cell of claim 6 wherein at least 95% by weight of the $MnO_2$ in the filamentary protrusions is ramsdellite $MnO_2$.

8. An electrochemical cell having $MnO_2$ cathode active material in said cell, wherein said electrochemical cell has an anode comprising lithium, and wherein said $MnO_2$ material comprises gamma $MnO_2$ particles having filamentary protrusions of $MnO_2$ jutting out from the surface of said particles, wherein at least the majority by weight of the $MnO_2$ in the filamentary protrusions is ramsdellite $MnO_2$.

9. The electrochemical cell of claim 8 wherein the gamma $MnO_2$ particles comprise at least 95% by weight of said $MnO_2$ material and wherein said filamentary protrusions consist essentially of ramsdellite $MnO_2$.

10. The electrochemical cell of claim 8 wherein the protrusions are substantially uniformly distributed over the surface of said particles and the filament protrusions have a length to width ratio between about 2:1 and 20:1.

11. An electrochemical cell having anode active material, a cathode active material and electrolyte in said cell, said cathode active material comprising a hybrid $MnO_2$ material comprising gamma $MnO_2$ on the surface of particles of electrolytic manganese dioxide (EMD), said hybrid $MnO_2$ material having filamentary protrusions of $MnO_2$ jutting out from the gamma $MnO_2$, wherein at least the majority by weight of the $MnO_2$ in said filamentary protrusions is ramsdellite $MnO_2$.

12. The electrochemical cell of claim 11 wherein at least 95% by weight of the $MnO_2$ in said filamentary protrusions is ramsdellite $MnO_2$.

13. An electrochemical cell having anode active material, a cathode active material and electrolyte in said cell, said cathode active material comprising a hybrid $MnO_2$ material comprising gamma $MnO_2$ on the surface of particles comprising carbonaceous material, said hybrid $MnO_2$ material having filamentary protrusions of $MnO_2$ jutting out from the gamma $MnO_2$, wherein at least the majority by weight of the $MnO_2$ in the filamentary protrusions is ramsdellite $MnO_2$.

14. The electrochemical cell of claim 13 wherein at least 95% of the $MnO_2$ in said filamentary protrusions is ramsdellite $MnO_2$.

* * * * *